Nov. 4, 1969

L. ALIMENT ET AL 3,476,432

COMBINATION CUSHION STORAGE ARRANGEMENT AND
FOLDING TABLE FOR VEHICLES

Filed Nov. 16, 1967

INVENTORS
LINDY ALIMENT
RANDY J. ALIMENT
MANIO L. PHILLIPS

ATTORNEY

INVENTORS
LINDY ALIMENT
RANDY J. ALIMENT
BY MANIO L. PHILLIPS

ATTORNEY

Nov. 4, 1969                L. ALIMENT ET AL                3,476,432
              COMBINATION CUSHION STORAGE ARRANGEMENT AND
                        FOLDING TABLE FOR VEHICLES
Filed Nov. 16, 1967                                    3 Sheets-Sheet 3
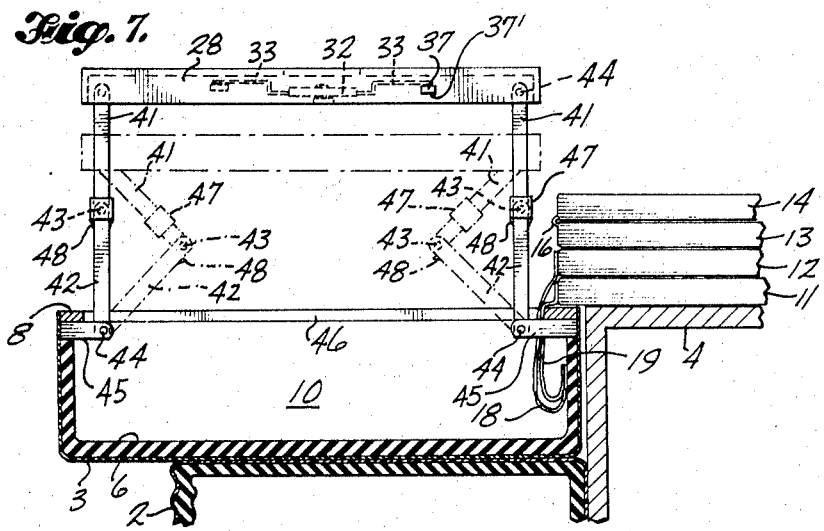
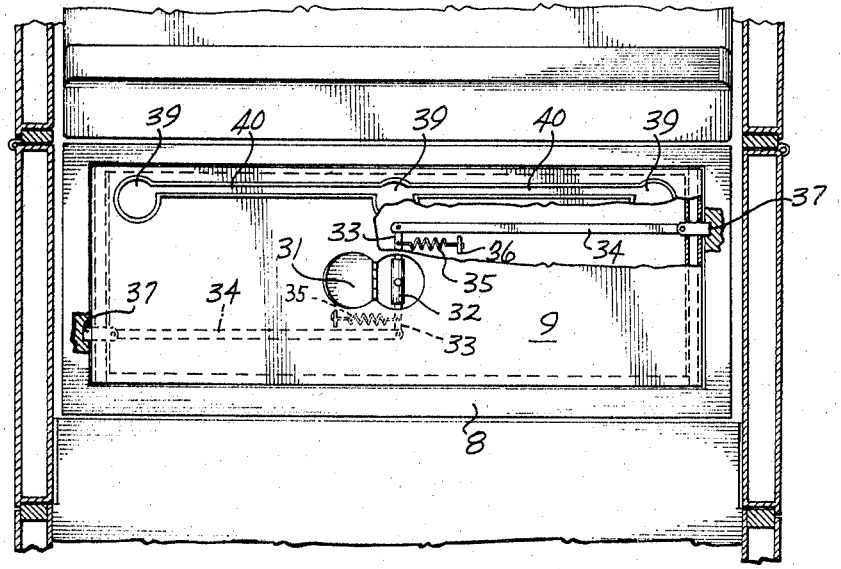
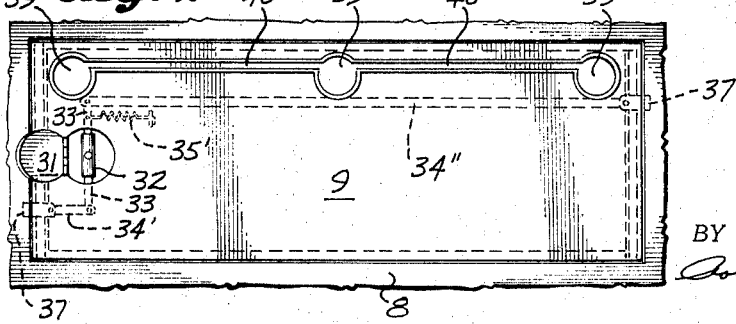
INVENTORS
LINDY ALIMENT
RANDY J. ALIMENT
MANIO L. PHILLIPS
BY
Robert W. Beach
ATTORNEY

United States Patent Office 3,476,432
Patented Nov. 4, 1969

3,476,432
**COMBINATION CUSHION STORAGE ARRANGE-
MENT AND FOLDING TABLE FOR VEHICLES**
Lindy Aliment and Randy Jarl Aliment, both of 7030 S.
129th Place, Seattle, Wash. 98178, and Manio Lido
Phillips, 613 S. 16th St., Renton, Wash. 98055
Filed Nov. 16, 1967, Ser. No. 683,667
Int. Cl. B60n *1/10*
U.S. Cl. 296—23          8 Claims

ABSTRACT OF THE DISCLOSURE

The hollow folding back of a station wagon rear seat houses a folded chain-section cushion. Such cushion is extendible to cover the wagon's rear deck from one section secured in the seat back hollow. A panel is raisable from a position forming the upper surface of the folded seat back to form a table top having folding legs straddling the stored cushion sections. Such legs may be scissors legs having their opposite ends slidable in tracks and normally biased toward each other. Alternatively the legs may be centrally jointed for folding. The table top panel is locked in stored position by a toggle joint latch.

---

It is a principal object of the present invention to provide cushions for the rear deck of a station wagon or other vehicle having a folding rear seat which can be stored without reducing the normal space or storage area of the vehicle interior.

Similarly, it is an important object to provide a table which can be readily set up to seat comfortably two or three passengers and which can be stored without reducing normal vehicle space or storage area.

An incidental object is to provide such a cushion storage and table arrangement which can be readily installed in existing vehicles with minimum modification and expense.

FIGURE 7 is a section similar to FIGURE 5 showing a modified table construction.

FIGURE 8 is a plan of the table top having parts in section and parts broken away to show the table latching mechanism, and FIGURE 9 is a plan of the table showing an alternate construction for the locking mechanism.

Figure 1:
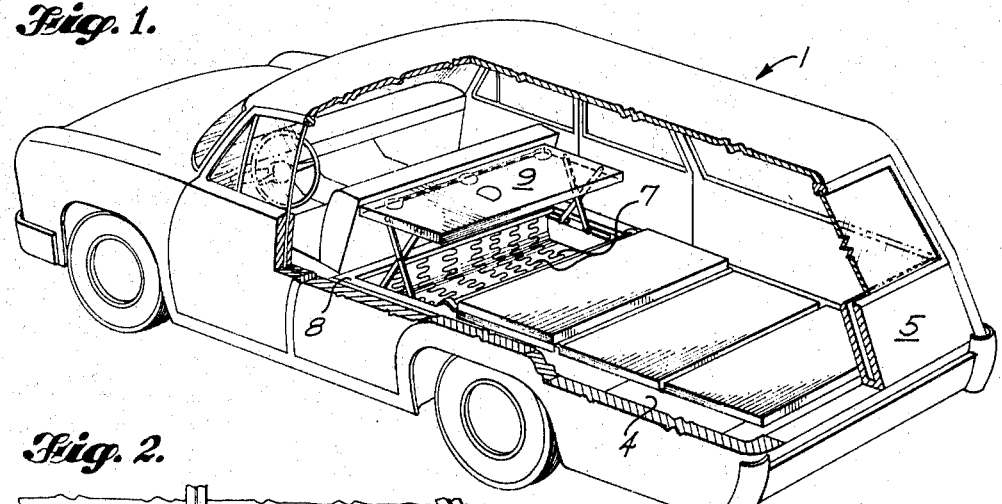
FIGURE 1 is a top perspective of a station wagon having parts broken away to show the cushions and table of the present invention.

Although the present invention is shown in connection with a station wagon, it can be used with equal advantage and facility in passenger cars equipped with a folding rear seat and in which the trunk compartment is accessible from the automobile interior, for example.

The station wagon 1 has a rear seat 2 with a folding seat back 3 and a deck 4 extending rearwardly from the seat back to the tailgate 5. The seat back in upright position has a forward face and top and bottom edges lined by a resilient cushion 6 backed up springs 7. The rear or aft face of the seat back is normally rigid and when the seat back is folded into a horizontal position the aft face is coplanar with and forms an extension of the deck 4.

Figure 2:
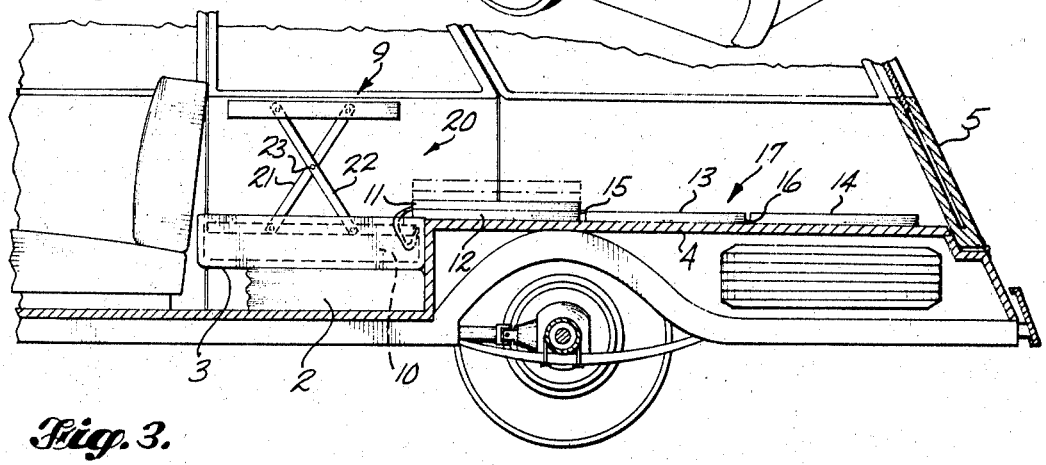
FIGURE 2 is a fragmentary longitudinal section through the rear portion of a station wagon showing the table in raised position and showing the cushion sections in deck-covering relationship in full lines and in stacked relationship in broken lines.

In accordance with the present invention the rear face of the seat back includes a rigid frame 8 for a movable panel 9. The cushion 6, frame 8 and panel 9 define a hollow 10 in which may be stored cushions for covering the deck 4. One cushion 11 has only a single cushion part. The other cushion 17 is a chain-section cushion shown as being composed of three cushion sections 12, 13 and 14 connected by webs. Cushion-sections 12, 13 and 14 are shown unfolded or extended in FIGURES 1 to 4 overlying deck 4, and cushion 11 is shown in FIGURES 1 and 2 as covering section 12 of the chain-section cushion. As shown best in FIGURES 3 and 4, cushion sections 12 and 13 are hingedly connected by a web 15 substantially coplanar with the upper surfaces of the cushion sections and sections 13 and 14 are hingedly connected by a web 16 substantially coplanar with the lower surfaces of the cushion sections. In other words, alternate webs connecting the cushions should be substantially coplanar with opposite faces of the chain-section cushion whatever the number of cushion sections.

A strap 18 has one end attached to the edge of cushion section 12 remote from hinge web 15. As shown best in FIGURES 5, 6 and 7, the opposite end of strap 18 is fastened to cushion 6 lining seat back 3. Such straps may be provided near each side edge of cushion 17 to limit sliding of the cushion relative to deck 4 during motion of the vehicle or vigorous romping of children, for example. If desired, the strap end secured in the hollow 10 may be fastened by snap-fasteners, for example, to enable the cushion to be removed and used exteriorly of the vehicle. Cushion 11 is similarly secured by straps 19 each having one end anchored in the seat back hollow.

Figure 3:
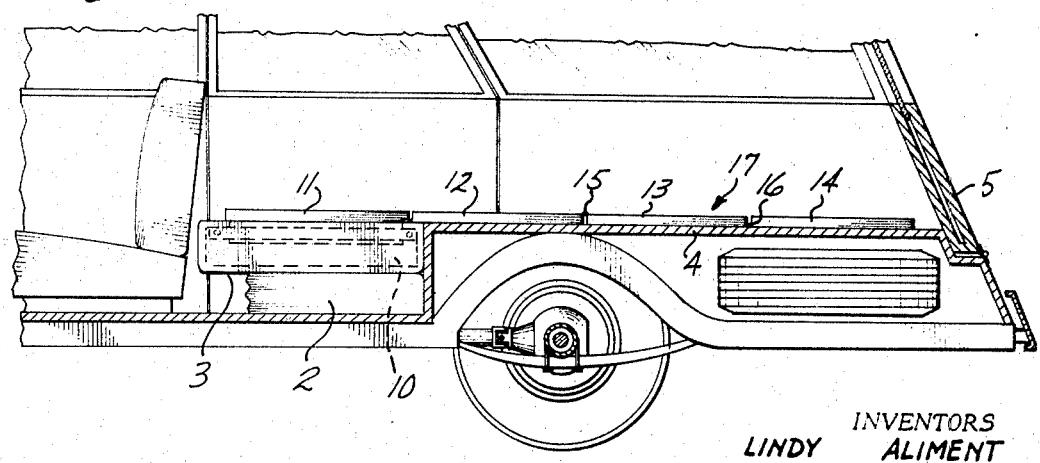
FIGURES 3 and 4 are similar to FIGURE 2, but show the table in retracted position and the seat back in folded and upright positions, respectively.
Figure 4:
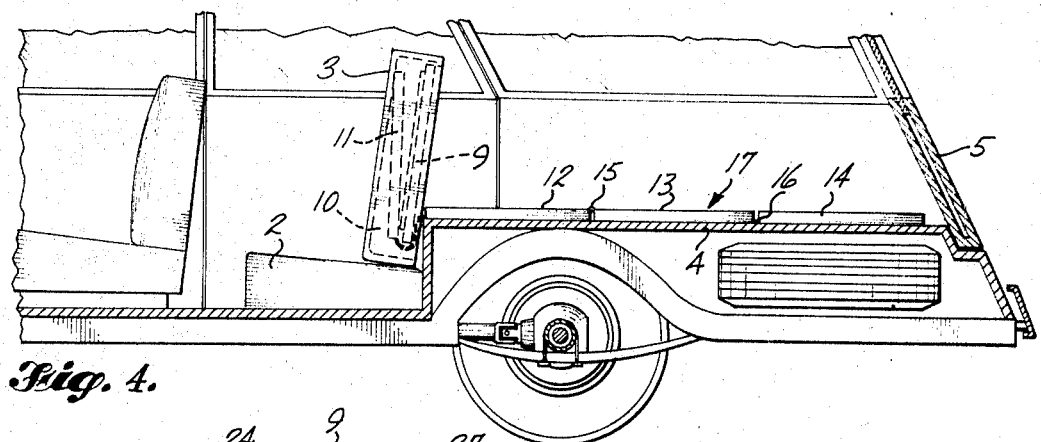

As clearly shown in FIGURE 3, when seat back 3 is folded forward to assume a horizontal position, cushions 11 and 17 cover substantially the entire deck of the station wagon. If desired, cushion 11 may be stored in the hollow and the seat back may remain upright as shown in FIGURE 4 while the chain-section cushion 17 is extended to cover deck 4.

Figure 6:
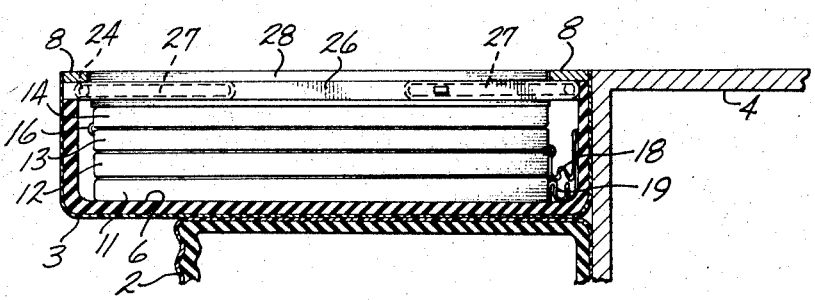
FIGURE 6 is a similar section showing the table and cushions in stored relationship.

When the cushions are to be stored in the hollow seat back 3, panel 9 is simply moved outwardly away from its frame 8, cushion 11 is placed in the hollow and cushion sections 12, 13 and 14 are folded to form a stack which lies on cushion 11 in hollow 10 as shown in FIGURE 6. Panel 9 is then replaced and the cushions are stored out of sight in an area which is normally wasted space. Straps 18 and 19 are sufficiently thin so that they will not be cut or chafed by panel 9 nor will they interfere with closure of the panel when the cushions are in use. Alternatively, notches may be provided in the panel and/or the frame through which the straps may extend.

Figure 5:
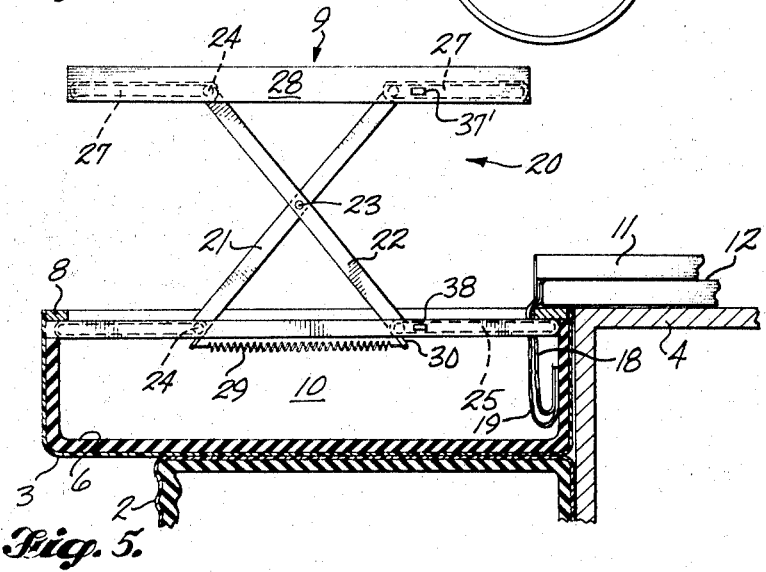
FIGURE 5 is an enlarged section through the seat back and adjacent portions of the seat and deck with the table and cushions in the full line-position of FIGURE 2.

As shown especially in FIGURES 1, 2 and 5, panel 9 forms the top of the table 20 having a pair of scissors legs 21, 22 at each side of the panel connected by pivot 23. On each end of each leg member 21 and 22 a stud 24 projects outwardly. The lower studs extend into grooves 25 in opposite ends of the tracks 26 having their lengths extending fore and aft at opposite sides of the horizontally-disposed seat back 3, as shown in FIGURE 5. The upper leg studs 24 engage in grooves 27 in down-turned side flanges 28 of the table top. When the table is in the raised position of FIGURE 5, studs 24 of each leg pair are disposed in the inner adjacent ends of grooves 25 and 27, respectively. Tension spring 29, connected between lugs 30 projecting from the lower ends of leg members 21 and 22, respectively, biases such leg ends toward each other to hold the table in raised position. When the table is to be lowered, pressure on its top 9 will spread the opposite ends of leg members 21 and 22 and studs 24 will slide in their respective grooves toward the outer groove ends.

Latch mechanism for holding the table in its lower, stored position is shown in FIGURES 8 and 9. A flap 31 is cut from the table top 9 and hinged at one side to provide access to handle 32 on link 33 pivoted to the inner adjacent ends of offset arms 34 of a toggle joint latch. A tension spring 35 is connected between link 33 adjacent to one link end and a lug 36 projecting downward from the under surface of table top 9 at one side of the link, and a second spring 35 is similarly connected between the link adjacent to its opposite end and a lug 36 spaced from the opposite link side. Such springs urge link 33 to rotate in a clockwise direction as seen in FIGURE 8, thereby urging arms 34 to move lengthwise outward toward opposite sides of the table top. Each table top side flange 28 has an aperture 37' which is aligned with aperture 38 in track 26 when the table is in its lowermost position. The outer end 37 of each latch arm 34 projects through aligned apertures 37' and 38 to lock the table top in its lower position. When handle 32 is turned in the counterclockwise direction as seen in FIGURE 8, the arms will be withdrawn from the respective aprtures to permit raising of the table.

In FIGURE 8, arms 34 are of substantially equal length and flap 31 is located centrally of the table top. Alternatively, the flap and handle can be located to one side of the table as shown in FIGURE 9, in which case arm 34' is considerably shorter than arm 34". In this instance, only one spring 35' is shown to bias the arms toward latching position. As shown in FIGURES 8 and 9, the table top may be provided with wells 39 which may be used to hold cups or glasses, for example, and one or more grooves 40 may be provided to hold pencils, crayons, or other items used on the table.

FIGURE 7 illustrates an alternate construction for the table legs. In this case, the legs are upright when the table is raised and each leg includes an upper strut 41 and a lower strut 42 pivotally connected to form a knee 43. Pivots 44 connected the upper ends of struts 41 to table flange 28 and the lower ends of struts 42 to arms 45 anchored to the fore and aft walls of the hollow 10. A sleeve 47 may be slid along each upper strut 41 to encircle knee 43 for preventing the knee from bending when the table is in its raised position. Such sleeve is supported in its leg-locking position by stops 48 on strut 42 of each leg. To fold the table, sleeves 47 are slid upward above knees 43 so that the legs will bend about their knees and will turn about pivots 44, as shown in broken lines in FIGURE 7. Tie bars 46 may extend fore and aft of the upper side of the hollow in the seat back 3 to support the table top in its lower position and to strengthen the seat back structure. The latch arrangement of FIGURE 8 or 9 may be provided, but in this instance arm ends 37 would project through flange apertures 37' and beneath tie bars 46.

As illustrated particularly in FIGURES 1, 2, 3, 4 and 6, the table and cushions may be disposed in a variety of positions. In FIGURE 1, the table 9 is raised, deck 4 is covered by chain-section cushion 17, and cushion 11 overlies cushion section 12 to form a seat behind the table. Hollow 10 forms a well for the feet of passengers sitting at the table. Alternatively, the sections of chain-section cushion 17 may be folded about hinges 15 and 16 and stacked on cushion 11 to form a higher table seat, as shown in broken lines in FIGURE 2. In FIGURE 3, the table is in its stored position and the deck area is extended by the folded seat back and cushion 11.

If it is desired to have the rear seat of the vehicle available for use, cushion 11 may be stored in the seat back while chain-section cushion 17 remains extended over deck 4. When it is desired to store all of the cushions, cushion 11 is placed in hollow 10 first, folded chain-section cushion 17 is placed on cushion 11 and the panel or table top 9 is locked in its lower position, as shown in FIGURE 6. The seat back may remain in its horizontal folded position or may be raised to assume its upright position. Although chain-section cushion 17 could be a continuous pad, it is preferred that this cushion be formed of hinged sections so that the folded cushion will stack readily without exerting a force tending to unfold the cushion sections. Frequent folding of a continuous cushion to the compact condition of FIGURE 6 for storage would tend to mat or tear the cushion material.

Because the table and cushion arrangement can be stored entirely in the seat back, such arrangement could be readily provided in existing vehicles by modifying the seat back or replacing a conventional seat back with the construction of the present invention. Similarly, the cushion and table arrangement can be provided as an optional item in new vehicles because no modification of vehicle design is required.

We claim:

1. Apparatus for use in a vehicle including a seat and a deck extending rearwardly behind the seat, such apparatus comprising a back for the seat having walls defining a rearwardly-opening hollow and foldable from a substantially upright position to a substantially horizontal position in which the hollow opens upwardly, a panel movable between a position closing the seat back hollow opening and a position providing access to such hollow, cushion means, and attaching means spanning between the cushion means and a wall of the seat back hollow, said cushion means having an area to cover substantially the vehicle deck and foldable to be received in the seat back hollow.

2. The apparatus defined in claim 1, the cushion means being of the chain-section type including a plurality of sections and hinge means connecting adjacent sections of said cushion means.

3. The apparatus defined in claim 1, additional cushion means having an area to cover substantially the panel, and additional attaching means spanning between said additional cushion means and a wall of the hollow.

4. The apparatus defined in claim 1, the panel being a table top, and leg means supporting said table top and foldable between an extended position supporting said table top spaced above the folded substantially horizontal seat back and a retracted position with the table top closing the seat back hollow.

5. The apparatus defined in claim 4, first track means in the table top, and second track means spanning the seat back hollow opening, the leg means including scissors legs having their upper ends slidable in said first track means and their lower ends slidable in said second track means.

6. The apparatus defined in claim 4, leg-supporting means projecting from walls of the hollow, the leg means being a plurality of upright posts, each of said posts including a pivoted knee joint intermediate its ends, pivot means connecting the upper post ends to the table top, and further pivot means connecting the lower post ends to said leg-supporting means.

7. The apparatus defined in claim 4, the cushion means being of a width slightly less than the width of the hollow opening, and the leg means supporting opposite sides of the table top and spaced apart a distance greater than the width of the cushion means.

8. The apparatus defined in claim 4, and toggle-joint latching means operable to latch the table top in its hollow-closing position.

References Cited

UNITED STATES PATENTS

| | | | |
|---|---|---|---|
| 2,232,353 | 2/1941 | Votypka | 296—24 |
| 446,632 | 2/1891 | Easte | 297—191 X |
| 2,320,215 | 5/1943 | Brenner | 297—191 X |

PHILIP GOODMAN, Primary Examiner

U.S. Cl. X.R.

296—37, 69; 297—191